(12) United States Patent
Yoo

(10) Patent No.: US 9,236,597 B2
(45) Date of Patent: Jan. 12, 2016

(54) BATTERY PACK

(71) Applicant: Samsung SDI Co., Ltd., Yongin-si, Gyeonggi-do (KR)

(72) Inventor: Dae-Hyong Yoo, Yongin-si (KR)

(73) Assignee: SAMSUNG SDI CO., LTD., Gyeonggi-do (KR)

( * ) Notice: Subject to any disclaimer, the term of this patent is extended or adjusted under 35 U.S.C. 154(b) by 13 days.

(21) Appl. No.: 14/213,409

(22) Filed: Mar. 14, 2014

(65) Prior Publication Data
US 2014/0287276 A1 Sep. 25, 2014

(30) Foreign Application Priority Data

Mar. 25, 2013 (KR) .......................... 10-2013-0031506

(51) Int. Cl.
*H01M 2/34* (2006.01)
*H01M 10/42* (2006.01)

(52) U.S. Cl.
CPC ............ *H01M 2/348* (2013.01); *H01M 10/425* (2013.01); *H01M 2200/10* (2013.01)

(58) Field of Classification Search
CPC .......... H01M 10/425; H01M 2200/10; H01M 2/348; H01M 10/4257; H01M 2200/00; H01M 2200/105; H01M 2200/106
See application file for complete search history.

(56) References Cited

U.S. PATENT DOCUMENTS

| | | | |
|---|---|---|---|
| 2005/0118463 A1* | 6/2005 | Okachi et al. ...................... 429/7 |
| 2006/0032667 A1* | 2/2006 | Sato ............................... 174/260 |
| 2008/0286634 A1* | 11/2008 | Naito ..................... H01M 2/105 |
| | | | 429/92 |
| 2011/0177379 A1 | 7/2011 | Maguire |
| 2012/0034495 A1* | 2/2012 | Lee ........................ H01M 2/105 |
| | | | 429/7 |
| 2012/0129013 A1* | 5/2012 | Lee ................................... 429/7 |
| 2012/0141839 A1* | 6/2012 | Hong .................... H01M 2/105 |
| | | | 429/7 |
| 2012/0225334 A1* | 9/2012 | Lee ........................ H01M 2/348 |
| | | | 429/62 |
| 2012/0251849 A1* | 10/2012 | Park ...................... H01M 2/105 |
| | | | 429/7 |

FOREIGN PATENT DOCUMENTS

KR  1998-0022678 U  7/1998
KR  10-2008-0008837 A1  1/2008

* cited by examiner

*Primary Examiner* — Carlos Barcena
(74) *Attorney, Agent, or Firm* — Knobbe, Martens, Olson & Bear LLP

(57) ABSTRACT

A battery pack including a plurality of bare cells, a protective circuit module having a thermistor, and a case accommodating the bare cells and the protective circuit module therein is disclosed. The case may include a mounting portion having the thermistor mounted thereon and a first rib portion. The mounting portion may form a separate space between the mounting portion and the bare cells. The first rib portion may be positioned in the separate space. Accordingly, the thermistor may be guided to a particular position within the case by the first rib portion, thereby preventing damage to the thermistor.

8 Claims, 3 Drawing Sheets

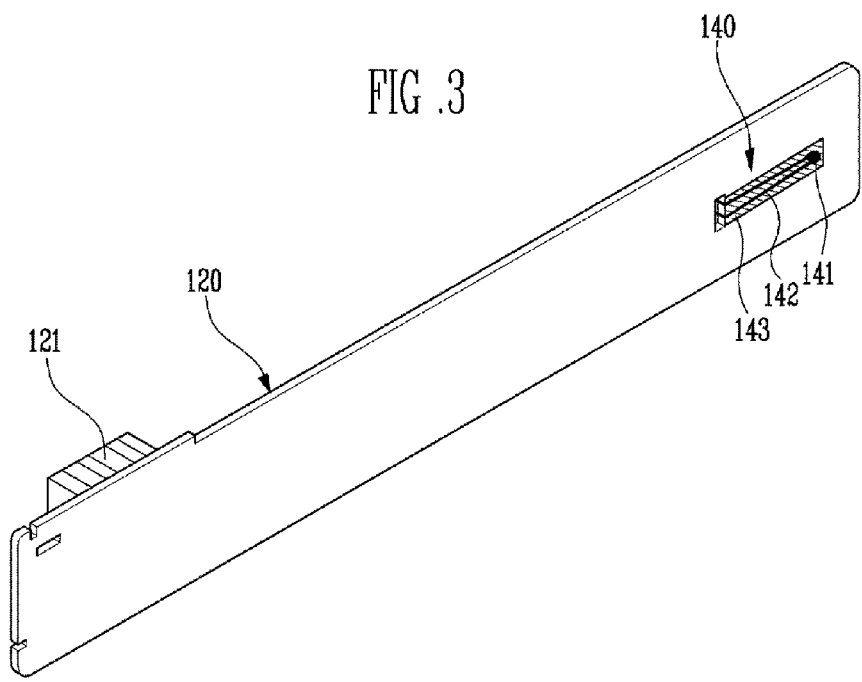
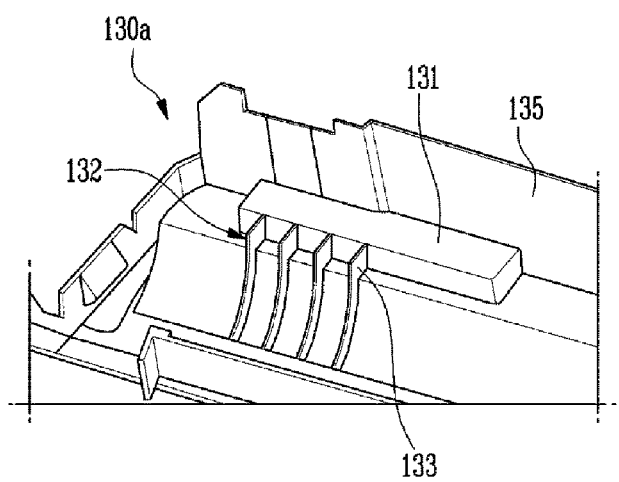

BATTERY PACK

CROSS-REFERENCE TO RELATED APPLICATIONS

This application claims priority to and the benefit of Korean Patent Application No. 10-2013-0031506, filed on Mar. 25, 2013, in the Korean Intellectual Property Office, the entire content of which is incorporated herein by reference.

BACKGROUND

1. Field

An aspect of the present disclosure relates to a battery pack.

2. Description of the Related Technology

With the rapid development of electronic and communication industries, the prevalence of mobile electronic devices has increased. Secondary batteries are widely used as power sources of the mobile electronic devices in consideration of economical efficiency. For example, the secondary batteries can be used not only in cellular phones or notebook computers, but also in medium- and large-sized apparatuses such as electric motor tools, electric bicycles and automobiles, which require both high output and power. Such an apparatus thus requires a high-output and a high-power source. To this end, a battery pack is used as one power source when connecting a plurality of secondary batteries in series or parallel. As such, the battery pack having the plurality of secondary batteries further includes various protection devices for safety. One type of protection device is a thermistor configured to measure the battery pack temperature. If the temperature of the battery pack rapidly increases before the battery pack generates heat or fire, the thermistor senses a temperature of a bare cell and transmits the sensed temperature to a protective circuit module, thereby cutting off current.

SUMMARY OF CERTAIN INVENTIVE ASPECTS

In one aspect, a battery pack including a protective circuit module having a thermistor is provided.

In another aspect, a battery pack capable of easily guiding the position of a thermistor when the thermistor is mounted in a case is provided.

In another aspect, a battery pack is provided that may include, for example, a plurality of bare cells; a protective circuit module having a thermistor; and a case accommodating the bare cells and the protective circuit module therein.

In some embodiments, the protective circuit module includes a mounting portion having the thermistor mounted thereon and a first rib portion. In some embodiments, the mounting portion forms a separate space between the mounting portion and the bare cell, and the first rib portion is positioned in the separate space. In some embodiments, the thermistor may include a head portion sensing a temperature of the bare cell; and a connection portion transmitting the temperature of the bare cell, sensed by the head portion, to the protective circuit module by connecting the head portion and the protective circuit module to each other. In some embodiments, the first rib portion may be formed at a position corresponding to the head portion. In some embodiments, the first rib portion may include a plurality of ribs, and the interval between the adjacent ribs may be smaller than the size of the head portion. In some embodiments, the thermistor may further include an insulation film in addition to the head portion and the connection portion. In some embodiments, the battery pack may further include a fixing member fixing the thermistor to the mounting portion or the bare cell. In some embodiments, the first rib portion may contact the bare cell. In some embodiments, a second rib portion is positioned on the same plane as the first rib portion so as to be spaced apart from the first rib portion may be further provided in the case. In some embodiments, the plurality of bar cells may be supported in the case by the first and second rib portions. In some embodiments, the first rib portion may be extended from the mounting portion to a region of the case, on which the bare cell is mounted.

Other features and advantages of the present disclosure will become more fully apparent from the following detailed description, taken in conjunction with the accompanying drawings.

Terms or words used in this specification and claims should not be restrictively interpreted as ordinary meanings or dictionary-based meanings, but should be interpreted as meanings and concepts conforming to the scope of the present disclosure on the basis of the principle that an inventor can properly define the concept of a term to describe and explain his or her disclosure in the best ways.

As described above, according to the present disclosure, it is possible to provide a battery pack including a protective circuit module having a thermistor.

Further, a first rib portion is provided between a mounting portion having the thermistor mounted thereon and a bare cell, so that the mounting position of the thermistor can be easily guided, and accordingly, it is possible to convenience in the manufacturing of the battery pack.

Further, the first rib portion is mounted in a separate space between the mounting portion and the bare cell, so that it is possible to prevent the thermistor from being damaged by inserting a head portion of the thermistor into the separate space.

Further, the position of the thermistor is guided by the first rib portion, so that it is possible to exactly measure a temperature of the bare cell.

Further, the first rib portion supports the bare cell, so that although an external impact is applied, it is possible to prevent the bare cell from being moved in a case.

BRIEF DESCRIPTION OF THE DRAWINGS

The accompanying drawings, together with the specification, illustrate exemplary embodiments of the present disclosure, and, together with the description, serve to explain the principles of the present disclosure.

FIG. 3 is a perspective view showing a thermistor and a protective circuit module in the battery pack shown in FIG. 1.

FIG. 4 is a perspective view showing a portion of the inside of a case in the battery pack shown in FIG. 1.

DETAILED DESCRIPTION OF CERTAIN INVENTIVE EMBODIMENTS

Figure 1:
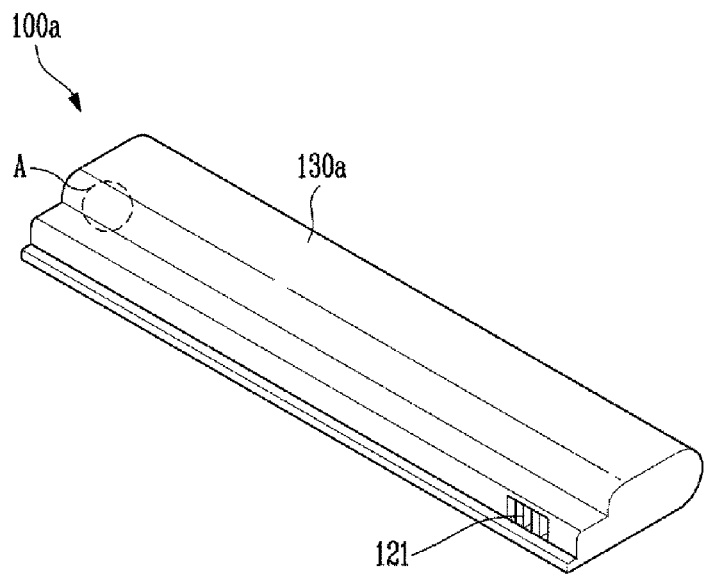
FIG. 1 is a perspective view of a battery pack according to an embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

Figure 2:
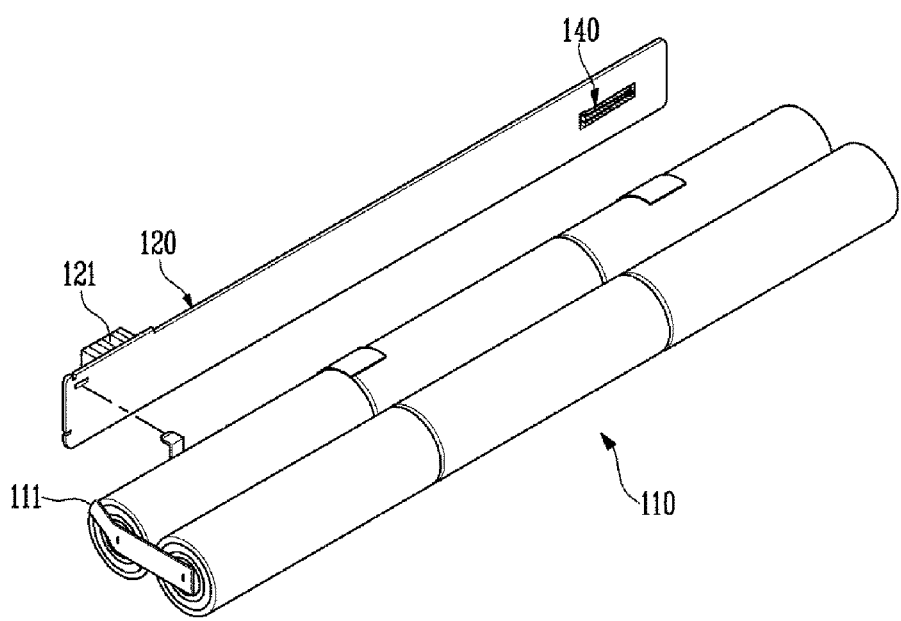
FIG. 2 is an exploded perspective view of the battery pack shown in FIG. 1.

FIG. 1 is a perspective view of a battery pack 100a according to an embodiment of the present disclosure. FIG. 2 is an exploded perspective view of the battery pack 100a shown in FIG. 1. Hereinafter, the battery pack 100a according to this embodiment will be described with reference to FIGS. 1 and 2.

As shown in FIGS. 1 and 2, the battery pack 100a according to this embodiment includes a plurality of bare cells, a protective circuit module 120 having a thermistor 140, and a case 130 accommodating or housing the bare cells 110 and the protective circuit module 120 therein. A first rib portion 132 (shown in FIG. 4) may be provided in the case 130a.

A single bare cell 110 is a member that generates electrochemical energy by moving ions or electrons. Within the battery pack 100a, a plurality of bare cells 110 are included. The bare cell 110 may be manufactured by accommodating or housing an electrode assembly and an electrolyte in a battery case. Here, the electrode assembly is formed by winding or stacking a positive electrode, a negative electrode and a separator interposed between these electrode plates. The electrode assembly is configured to generate energy by an electrochemical reaction between the electrode assembly and the electrolyte, and generated energy from the electrochemical reaction is supplied to wires outside of the bare cell 110 through electrode tabs, etc. For example, the battery case may be a pouch-type, prismatic or cylindrical case.

As mentioned above, a plurality of the bare cells 110 may be arranged in the case 130a. For example, the bare cells 110 may be provided in a double column and may be connected in series or parallel to one another. The bare cells 110 may be connected to one another through a plurality of electrode leads 111.

The protective circuit module 120 is a member capable of controlling voltage or current during charging and discharging of the bare cell 110.

The protective circuit module 120 may include a circuit board having a circuit pattern formed thereon. Several electronic components may be mounted on one surface of the protective circuit module 120. Here, the electronic components may include, for example, a field effect transistor (FET), an integrated circuit (IC), a positive temperature coefficient (PTC), etc. The electronic components may function to control the electrode assembly in the bare cells 110 or cutting off a circuit when the electrode assembly is abnormally operated. The circuit board of the protective circuit module 120 may include a switching circuit, so that it is possible to more efficiently control or protect the battery pack 100a together with the electronic components. Specifically, the circuit board may be configured to block overcharging, overdischarging, short circuit and reverse voltage of the battery pack 100a, thereby preventing explosion, overheat and leakage of the battery pack 100a and deterioration of charging/discharging characteristics. Further, the circuit board may be configured to prevent degradation of electrical performance and abnormal operation, thereby eliminating dangerous factors and extending the lifespan of the battery pack 100a.

The protective circuit module 120 may further include a separator connector 121. The connector 121 is a portion fastened to an external electronic device. The protective circuit module 120 may be electrically connected to the external electronic device by the connector 121. Meanwhile, the protective circuit module 120 may be provided with the thermistor 140. The thermistor 140 will be described in detail with reference to FIG. 3.

The case 130a is a member formed to accommodate or house the bare cells 110 and the protective circuit module 120 therein. In some embodiments, the case may include two sub-cases.

Here, the bare cells 110 and the protective circuit module 120 are accommodated in any one of the two sub-cases; one sub-case is coupled to the other sub-case, so that the bare cells 110 and the protective circuit module 120 can all be accommodated in the case 130a. In this case, a step difference (implemented as a protective circuit module mounting portion 135 in FIG. 4) is formed in any one of the two sub-cases so as to provide a space in which the protective circuit module 120 can be accommodated. Accordingly, it is possible to implement the miniaturization of the battery pack 100a.

Meanwhile, the protective circuit module 120 may be positioned so that a wide surface of the protective circuit module 120 faces the bare cells 110 as shown in FIG. 2. Alternatively, the protective circuit module 120 may be mounted perpendicular to the position of the protective circuit module 120 of FIG. 2, for example, so that the wide surface of the protective circuit module 120 faces an upper or lower portion of the bare cell 110.

A mounting portion 131 (shown in FIG. 4) having the thermistor 140 mounted thereon and a first rib portion 132 (shown in FIG. 4) may be provided in the case 130a. Hereinafter, the mounting portion 131 and the first rib portion 132 will be described in detail later.

FIG. 3 is a perspective view showing the thermistor 140 and the protective circuit module 120 in the battery pack 100a shown in FIG. 1. Hereinafter, the thermistor 140 according to this embodiment will be described in detail with reference to FIG. 3. As shown in FIG. 3, the thermistor 140 is a member provided to the protective circuit module 120 so as to be configured to sense a temperature of at least one of the bare cells 110. In some embodiments, the thermistor is configured to sense temperature of all of the bare cells 110 individually or an average temperature of all of the bare cells 110 together.

Here, the thermistor 140 may include a head portion 141, a connection portion 142 and an insulation film 143. The head portion 141 is configured to directly measure the temperature of a single bare cell 110 or an average temperature of the plurality of bare cells 110. The head portion may have, for example, a feature that allows resistance to change depending on ambient temperature. The head portion 141 may have, for example, the feature of a positive or negative temperature coefficient. The connection portion 142 is a member that transmits the temperature of the bare cell 110, measured by the head portion 141, to the protective circuit module 120 by connecting the head portion 141 and the protective circuit module 120 to each other. The connection portion 142 may be implemented with a pair of lead lines connected to the head portion 141, and each lead line may be coupled to the protective circuit module 120 through soldering. Although it has been illustrated in FIG. 3 that one side of the connection portion 142 is inserted into a through-hole formed in the protective circuit module 120, the present disclosure is not limited thereto. That is, the connection portion 142 may be directly connected on one surface of the protective circuit module 120.

Meanwhile, the head portion 141 and a portion of the connection portion 142 may be covered by the insulation film 143. The insulation film 143 may be configured to prevent the thermistor 140 from being unintentionally short-circuited. However, the insulation film 143 may not be a necessarily required component.

The connection portion 142 may have a shape bent to extend from the wide surface of the protective circuit module 120, and accordingly, a wide surface of the insulation film 143 can face the bare cells 110. However, the present disclosure is not limited thereto, and the connection portion 142 may be mounted so that the wide surface of the insulation film 143 faces the upper or lower portion of the bare cells 110.

Figure 5:
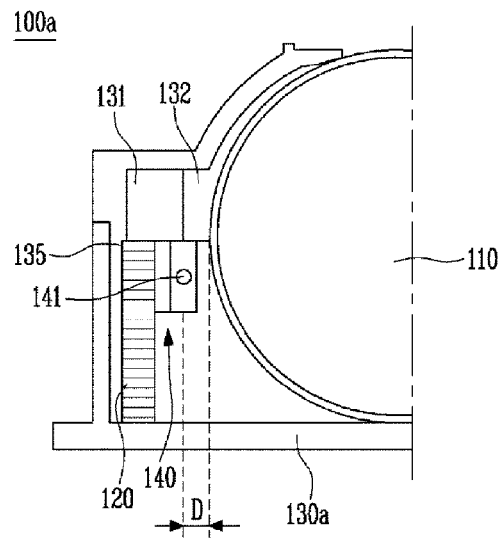
FIG. 5 is a sectional view of the battery pack shown in FIG. 1.

FIG. 4 is a perspective view showing a portion "A" of the case 130a in the battery pack 100a shown in FIG. 1. FIG. 5 is a sectional view of the battery pack 100a shown in FIG. 1. Hereinafter, the position relationship between the thermistor 140 and the case 130 will be described with reference to FIGS. 4 and 5. Here, it is previously described that the inside of portion A shown in FIG. 1 is vertically reversed in the case 130a shown in FIG. 4.

As shown in FIGS. 4 and 5, the mounting portion 131 and the first rib portion 132 may be provided in the case 130a. Here, the mounting portion 131 is a portion provided in the case 130a so as to allow the thermistor 140 mounted thereon. The mounting portion 131 may be provided to protrude from an inner surface of the case 130a, and at least one portion of the thermistor 140 may be mounted on the mounting portion 131. In this case, the mounting portion 131 may be positioned to form a separate space D between the mounting portion 131 and the bare cell 110. The protective circuit module mounting portion 135 may be formed adjacent to the mounting portion 131 inside the case 130a so as to be stepped with the mounting portion 131. The protective circuit module 120 may be mounted on the protective circuit module mounting portion 135.

Meanwhile, at least one portion of the first rib portion 132 may be positioned in the separate space D between the mounting portion 131 and the bare cell 110. In this case, the first rib portion 132 may include a plurality of ribs 133, and the interval between adjacent ribs 133 may be smaller than the size of the head portion 141 of the thermistor 140. Thus, it is possible to prevent the head portion 141 of the thermistor 140 from being inserted into the separate space D between the mounting portion 131 and the bare cell 110. Accordingly, it is possible to prevent damage to the thermistor 140. Thus, damage to the thermistor 140 is prevented and the position of the thermistor 140 is exactly set, so that the head portion 141 of the thermistor 140 can more accurately and/or precisely measure the temperature of the bare cells 110. To this end, the first rib portion 132 is preferably mounted at a position corresponding to the head portion 141, and the head portion 141 may be positioned on the first rib portion 132 so as to contact the first rib portion 132.

The first rib portion 132 may guide the thermistor 140 to the mounting portion 131 when the thermistor 140 is mounted. Thus, although the thermistor 140 is not exactly mounted at a desired position in the manufacturing of the battery pack 100a, the position of the thermistor 140 can be guided by the first rib portion 132. Accordingly, manufacturing of the battery pack 100a is significantly more convenient than previously known techniques for manufacturing battery packs.

The first rib portion 132 may be extended from the mounting portion 131 to a region of the case 130a, on which the bare cell 110 is mounted. Accordingly, in a case where the bare cell 110 is mounted, at least one portion of the first rib portion 132 may be formed to contact the outer circumferential surface of the bare cell 110. The first rib portion 132 is formed in a shape supporting the outer circumferential surface of the bare cell 110, and supports the bare cell 110 not to move in the case 130a, thereby improving the safety of the battery pack 100a.

Meanwhile, the thermistor 140 may be adhered to the mounting portion 131 or the bare cell 110 through a fixing member such as a double-faced tape or silicon adhesive. In this case, the position of the thermistor 140 can be more firmly fixed. To accurately and/or precisely measure the temperature of the bare cells 110, the thermistor 140 may be preferably adhered to the bare cells 110 so that the head portion 141 of the thermistor 140 directly contacts the bare cell 110.

Figure 6:
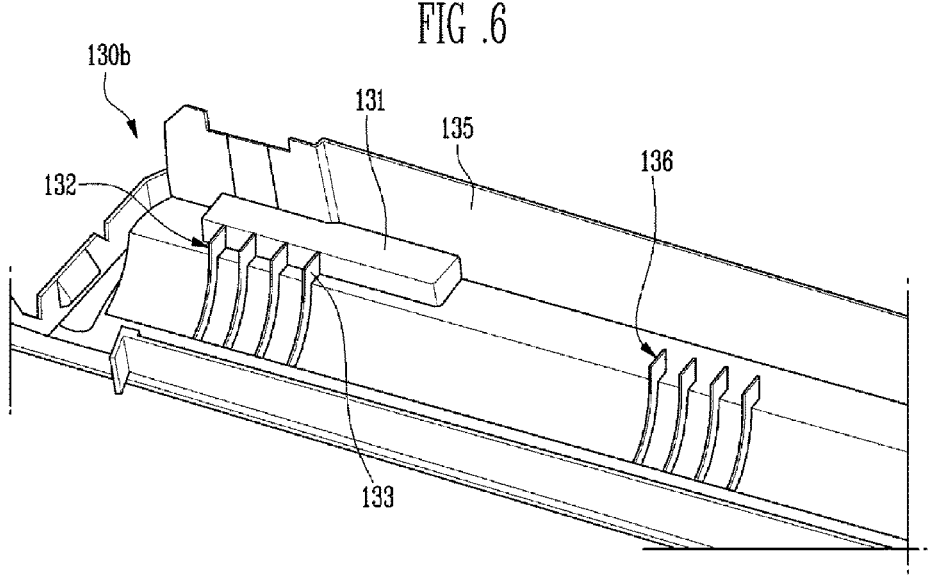
FIG. 6 is a perspective view showing a portion of the inside of a case in a battery pack according to another embodiment of the present disclosure.

FIG. 6 is a perspective view showing a portion of a case 130b in a battery pack according to another embodiment of the present disclosure. Hereinafter, the battery pack according to this embodiment will be described with reference to FIG. 6. Here, it is previously described that the case 130b corresponds to another embodiment of the inside of the portion A shown in FIG. 1. As shown in FIG. 6, in the battery pack according to this embodiment, a second rib portion 136 is further provided together with the first rib portion 132 in the case 130b. Here, the case 130b according to this embodiment may further include the second rib portion 136. Accordingly, it is possible to more effectively prevent the movement of the bare cells 110 in the case 130b. Specifically, the second rib portion 136 of the case 130b may be provided on the same plane as the first rib portion 132, and may be positioned to be spaced apart from the first rib portion 132. Thus, one and the other ends of a bare cell bundle configured with a plurality of bare cells 110 can be supported by the first and second rib portions 132 and 136, respectively. Accordingly, although an external force may be applied to the battery pack, the bare cells 110 cannot be moved or jostled within the case 130b. In this case, the second rib portion 136 does not perform the function of guiding the thermistor 140, and hence it is sufficient if the second rib portion 136 is formed in a shape supporting at least one portion of the outer circumferential surface of the bare cell 110. Meanwhile, like the first rib portion 132, the second rib portion 136 may include a plurality of ribs. The number of the ribs and the interval between the ribs may be the same as the first rib portion 132 so as to equally support both the ends of the bundle of the bare cells 110.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:
1. A battery pack, comprising:
a plurality of bare cells;
a protective circuit module having a thermistor; and
a case accommodating the bare cells and the protective circuit module therein, the case including a mounting portion having the thermistor mounted thereon and a first rib portion,
wherein a separate space is formed between the mounting portion and the bare cells, wherein the first rib portion is positioned in the separate space, wherein the thermistor includes a head portion capable of sensing a temperature of at least one of the bare cells and a connection portion electronically connected to the protective circuit module, wherein the connection portion is capable of transmitting the sensed temperature to the protective circuit module, wherein the first rib portion includes a plurality of ribs, and wherein an interval between adjacent ribs in the plurality of ribs is smaller than the size of the head portion.

2. The battery pack of claim 1, wherein the first rib portion is formed at a position corresponding to the head portion.

3. The battery pack of claim 1, wherein the thermistor further includes an insulation film.

4. The battery pack of claim 1, further comprising a fixing member fixing the thermistor to the mounting portion or at least one of the bare cells.

5. The battery pack of claim 1, wherein the first rib portion contacts at least one of the bare cells.

6. The battery pack of claim 1, wherein a second rib portion is positioned in the same plane as the first rib portion in the case, and wherein the second rib portion is positioned spaced apart from the first rib portion.

7. The battery pack of claim 6, wherein the plurality of bare cells are supported in the case by the first and second rib portions.

8. The battery pack of claim 1, wherein the first rib portion extends from the mounting portion to a region of the case on which the plurality of bare cells is mounted.

* * * * *